United States Patent
Wu et al.

(10) Patent No.: US 12,425,905 B2
(45) Date of Patent: Sep. 23, 2025

(54) METHOD AND APPARATUS FOR REPORTING FAILURE INFORMATION IN A COMMUNICATION SYSTEM

(71) Applicant: Lenovo (Beijing) Ltd., Beijing (CN)

(72) Inventors: Lianhai Wu, Chaoyang (CN); Joachim Löhr, Wiesbaden (DE); Hyung-Nam Choi, Ottobrunn (DE); Hongmei Liu, Changping District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 231 days.

(21) Appl. No.: 17/910,707

(22) PCT Filed: Mar. 27, 2020

(86) PCT No.: PCT/CN2020/081821
§ 371 (c)(1),
(2) Date: Sep. 9, 2022

(87) PCT Pub. No.: WO2021/189466
PCT Pub. Date: Sep. 30, 2021

(65) Prior Publication Data
US 2023/0156505 A1    May 18, 2023

(51) Int. Cl.
*H04W 24/10* (2009.01)
(52) U.S. Cl.
CPC ................... *H04W 24/10* (2013.01)
(58) Field of Classification Search
CPC ...... H04W 24/10; H04W 76/18; H04W 76/19
See application file for complete search history.

(56) References Cited

U.S. PATENT DOCUMENTS

| | | | | |
|---|---|---|---|---|
| 2019/0380052 A1* | 12/2019 | Yang | ............ | H04W 72/23 |
| 2020/0092784 A1* | 3/2020 | Hampel | ............ | H04W 76/27 |
| 2020/0169906 A1* | 5/2020 | Tsuboi | ............ | H04W 76/27 |
| 2020/0267795 A1* | 8/2020 | Jung | ............ | H04W 36/16 |

(Continued)

FOREIGN PATENT DOCUMENTS

| | | |
|---|---|---|
| CN | 107079514 A | 8/2017 |
| CN | 108632902 A | 10/2018 |

(Continued)

OTHER PUBLICATIONS

PCT/CN2020/081821, "International Preliminary Report on Patentability", PCT Application No. PCT/CN2020/081821, Oct. 6, 2022, 5 pages.

(Continued)

*Primary Examiner* — Kenny S Lin
(74) *Attorney, Agent, or Firm* — FIG. 1 Patents

(57) ABSTRACT

The present disclosure relates to methods and apparatuses. According to some embodiments of the disclosure, a method includes: transmitting, at an access node, a failure information message to a base station, wherein the access node is connected to the base station via a master node and a secondary node, and wherein the failure information message includes a failure type of a backhaul link. The failure type is based on a failure type set including at least the following: an expiry of a physical layer problem timer, a random access problem, and reaching a maximum number of retransmission in response to radio link failure (RLF).

20 Claims, 10 Drawing Sheets

(56) References Cited

U.S. PATENT DOCUMENTS

| | | | | |
|---|---|---|---|---|
| 2021/0153281 A1* | 5/2021 | Deogun | ............... | H04W 76/16 |
| 2021/0378041 A1* | 12/2021 | Narasimha | ........... | H04W 76/19 |
| 2021/0400560 A1* | 12/2021 | Wu | ....................... | H04W 40/22 |
| 2022/0104098 A1* | 3/2022 | Takahashi | ........... | H04W 36/305 |
| 2022/0110180 A1* | 4/2022 | Jung | ..................... | H04W 76/30 |
| 2022/0124592 A1* | 4/2022 | Takahashi | ............ | H04W 76/19 |
| 2022/0141749 A1* | 5/2022 | Luo | ...................... | H04W 40/24 |
| | | | | 370/331 |

FOREIGN PATENT DOCUMENTS

| | | | | |
|---|---|---|---|---|
| CN | 110536350 A | | 12/2019 | |
| CN | 110622548 A | | 12/2019 | |
| CN | 110708766 A | | 1/2020 | |
| CN | 114666160 A | | 6/2022 | |
| EP | 3941115 A1 | | 1/2022 | |
| WO | WO-2020051588 A1 * | | 3/2020 | ............ H04W 24/00 |
| WO | WO-2021026936 A1 * | | 2/2021 | |

OTHER PUBLICATIONS

PCT/CN2020/081821 , "International Search Report and Written Opinion", PCT Application No. PCT/CN2020/081821, Dec. 11, 2020, 6 pages.

20927273.1 , "Extended European Search Report", EP Application No. 20927273.1, Dec. 1, 2023, 13 pages.

ETRI , "Discussion on S-RLF in Dual Connectivity", 3GPP TSG-RAN2 Meeting #87, R2-143409, Dresden, Germany [retrieved Dec. 29, 2023]. Retrieved from the Internet <https://www.3gpp.org/ftp/tsg_ran/wg2_rl2/TSGR2_87/Docs>, Aug. 2014, 4 pages.

FutureWEI , "Backhaul RLF Notification and Recovery Procedure", 3GPP TSG-RAN WG2 meeting #106, R2-1911066, Prague, Czech Republic [retrieved Dec. 29, 2023]. Retrieved from the Internet <https://www.3gpp.org/ftp/TSG_RAN/WG2_RL2/TSGR2_107/Docs/>, Aug. 2019, 3 pages.

"Foreign Office Action", CN Application No. 202080099002.4, Mar. 24, 2025, 28 pages.

"Foreign Office Action", Chinese Application No. 202080099002.4, Jul. 10, 2025, 38 pages.

* cited by examiner

METHOD AND APPARATUS FOR REPORTING FAILURE INFORMATION IN A COMMUNICATION SYSTEM

TECHNICAL FIELD

The present disclosure generally relates to wireless communication technology, and more particularly to failure information report in a wireless communication system.

BACKGROUND

In the 3rd Generation Partnership Project (3GPP), deployment of Relay Nodes (RNs) in a wireless communication system is promoted. One objective of deploying RNs is to enhance the coverage area of a Base Station (BS, also called gNB in 5G networks) by improving the throughput of a mobile device (also known as a User Equipment (UE)) that is located in a coverage hole or far from the BS, which can result in relatively low signal quality.

In a wireless communication system which employs RNs, a BS that can provide a connection to at least one RN is called a donor BS (or a donor node or a donor). An RN is connected to a donor BS by a backhaul link. The RN may hop through one or more RNs before reaching the donor BS, or may be directly connected to the donor BS. For New Radio (NR) communication networks, 3GPP is envisioning an Integrated Access and Backhaul (IAB) architecture for supporting multi-hop relays, wherein a donor node with multi-connectivity is also supported by an IAB node. That is, the IAB node may have a plurality of active routes to the donor BS via multiple parent IAB nodes. A multi-hop network may provide more range extension than a single-hop network. This is relatively more beneficial with respect to wireless communications at frequencies above 6 GHz, which have limited ranges when using single-hop backhauling. Multi-hop backhauling further enables backhauling around obstacles, e.g., buildings in an urban environment for in-cluster deployments.

There is a need for handling a failure in the backhaul link when multi-connectivity is supported in a wireless communication system.

SUMMARY OF THE DISCLOSURE

An embodiment of the present disclosure provides a method. The method may include: transmitting, at an access node, a failure information message to a base station, wherein the access node is connected to the base station via a master node and a secondary node, and wherein the failure information message includes a failure type of a backhaul link, and the failure type is based on a failure type set including at least the following: an expiry of a physical layer problem timer, a random access problem, and reaching a maximum number of retransmission in response to radio link failure (RLF).

Another embodiment of the present disclosure provides a method. The method may include: receiving, at a base station from an access node, a failure information message, wherein the access node is connected to the base station via a master node and a secondary node, the failure information message includes a failure type of a backhaul link, and the failure type is based on a failure type set including at least the following: an expiry of a physical layer problem timer, a random access problem, and reaching a maximum number of retransmission in response to radio link failure (RLF).

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
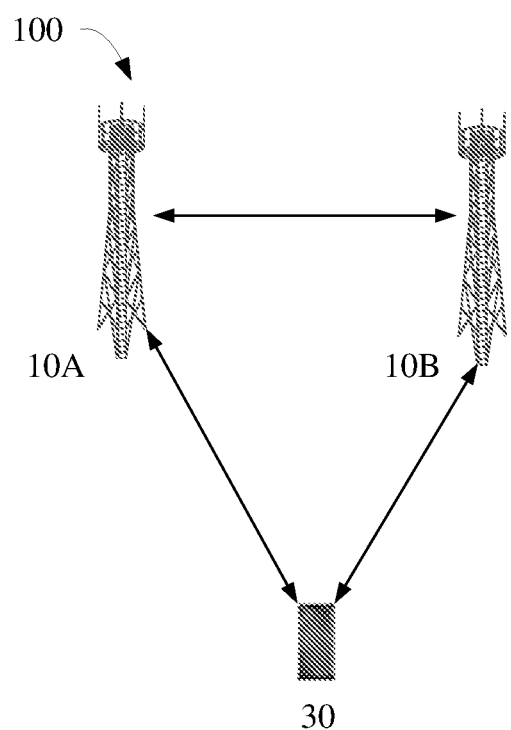
FIG. 1 illustrates a schematic wireless communication system according to some embodiments of the present disclosure.

FIG. 1 illustrates a schematic dual-connectivity wireless communication system 100 according to some embodiments of the present disclosure.

Referring to FIG. 1, the dual-connectivity wireless communication system 100 may include a UE (e.g., UE 30), which may be connected to two base stations (e.g., BS 10A and BS 10B). Although a specific number of UE and BSs are depicted in FIG. 1, it is contemplated that wireless communication system 100 may also include more or fewer BSs and UEs.

The UE and the base stations may support communication based on, for example, 3G, long-term evolution (LTE), LTE-advanced (LTE-A), new radio (NR), or other suitable protocol(s). For example, BS 10A or BS 10B may include an eNB or a gNB. UE 30 may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

BS 10A may act as a Master Node (MN), and BS 10B may act as a Secondary Node (SN). UE 30 may communicate with BS 10A or BS 10B via, for example, a Uu interface. BS 10A and BS 10B may communicate with each other via a network interface such as an Xn interface. At least the MN (e.g., BS 10A) is connected to a Core Network (not shown in FIG. 1). In some embodiments of the present disclosure, one of BS 10A and BS 10B may provide NR access and the other one of BS 10A and BS 10B may provide either E-UTRA (Evolved Universal Terrestrial Radio Access) or NR access.

UE 30 may connect to a Master Cell Group (MCG) and a Secondary Cell Group (SCG) through BS 10A and BS 10B, respectively. The MCGs and SCGs may be groups of cells associated with BS 10A and BS 10B, respectively, including a primary cell (PCell)/primary SCell (PSCell), and optionally one or more secondary cells (SCells). BS 10A may be configured to add or release SCGs associated with BS 10B. The link between a UE (e.g., UE 30) and an MN (e.g., BS 10A) may also be referred to as a MCG link, and the link between a UE (e.g., UE 30) and an SN (e.g., BS 10B) may also be referred to as a SCG link.

UE 30 may be configured to monitor the SCG of BS 10B and may detect SCG failures. In some embodiments of the present disclosure, UE 30 may initiate a procedure to report SCG failures when, for example, one of the following conditions is met:
upon detecting radio link failure for the SCG;
upon reconfiguration with sync failure of the SCG;
upon SCG configuration failure; and
upon integrity check failure indication from SCG lower layers concerning SRB3 (Signaling Radio Bearer type 3).

When an SCG failure is detected, UE 30 may report a SCG failure information message to an MN (e.g., BS 10A). BS 10A may handle the SCG failure information message, and may decide to keep, change, or release the SN/SCG.

UE 30 may also detect MCG failures. In some embodiments of the present disclosure, UE 30 may initiate a MCG recovery procedure to inform the MN (e.g., BS 10A) about an MCG link failure via the SCG link. UE 30 may be configured with split SRB1 (Signaling Radio Bearer type 1) or SRB3 to report MCG failures when a Radio Link Failure (RLF) on a MCG link happens.

In some examples, when SRB1 is configured as split SRB, UE 30 may start a timer (e.g., T316) and submit a MCG failure information message to lower layers for transmission to the MN (e.g., BS 10A) via SRB1. In some examples, when SRB3 is configured, UE 30 may encapsulate the MCG failure information message in another Radio Resource Control (RRC) message (e.g., uplink information transfer message for Multi-Radio Dual Connectivity (MRDC) or ULInformationTransferMRDC message), which is used for communication between a UE and a MN, and transmit the another RRC message via SRB3. After BS 10A receives the MCG failure information message, BS 10A may transmit a reconfiguration with sync message or a release message to UE 30.

Figure 2A:
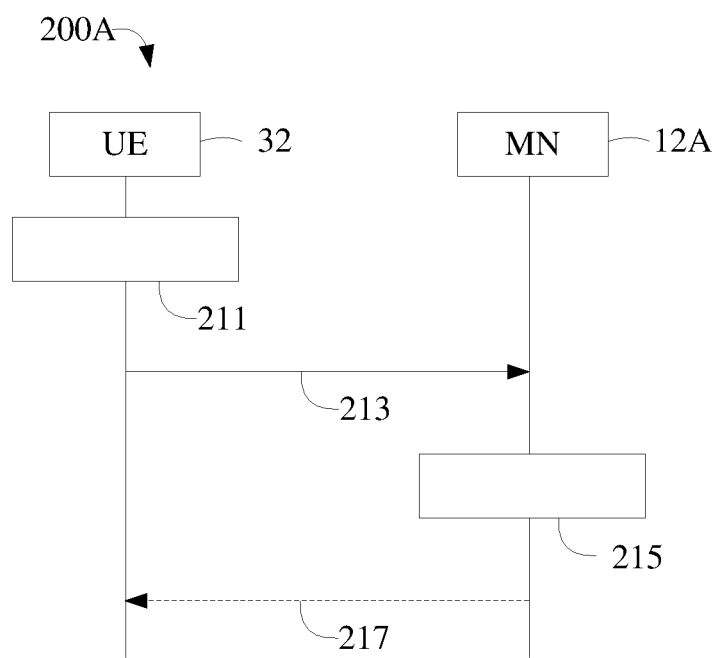
FIG. 2A illustrates an exemplary procedure of reporting a SCG failure according to some embodiments of the present disclosure.

FIG. 2A illustrates an exemplary procedure 200A of reporting a SCG failure according to some embodiments of the present disclosure. Details described in all of the foregoing embodiments of the present disclosure are applicable for the embodiments shown in FIG. 2A.

The exemplary procedure 200A shows a procedure of a UE (e.g., UE 32) communicating with a MN (e.g., MN 12A). In some examples, UE 32 may function as UE 30 in FIG. 1, and MN 12A may function as BS 10A or BS 10B in FIG. 1.

Referring to FIG. 2A, at the beginning, beside MN 12A, UE 32 may be in communication with a SN (not shown in FIG. 2), though which UE 32 may connect to a SCG. In operation 211, UE 32 may detect a SCG failure. In operation 213, Upon the SCG failure, UE 32 may report a SCG failure information message to MN 12A. In operation 215, MN 12A may determine to keep, change, or release the failed SCG link. In the case that MN 12A determines to change or release the SCG, MN 12A may transmit, in operation 217 (denoted by dotted arrow as an option), an RRC reconfiguration message or an RRC release message to UE 32. In the case that MN 12A determines to keep the SCG, operation 217 may be eliminated.

It should be appreciated by persons skilled in the art that the sequence of the operations in exemplary procedure 200A may be changed and some of the operations in exemplary procedure 200A may be eliminated or modified, without departing from the spirit and scope of the disclosure.

Figure 2B:
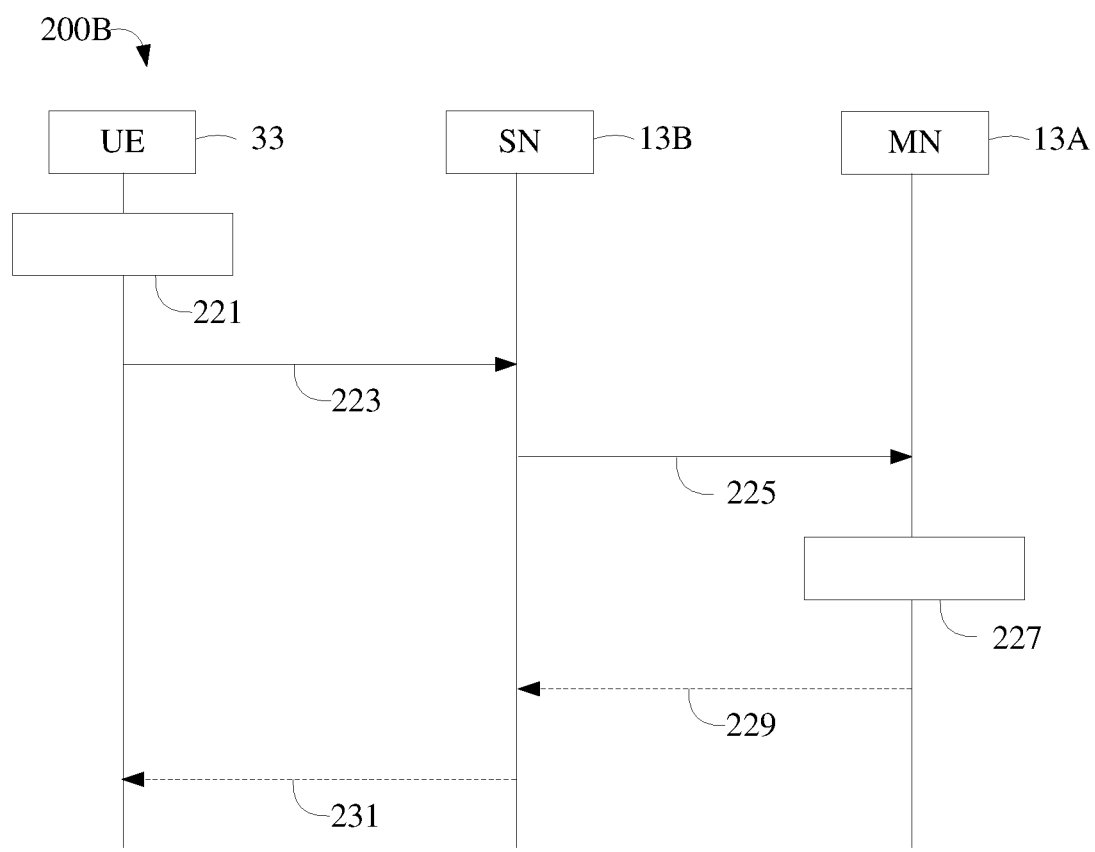
FIG. 2B illustrates an exemplary fast MCG link recovery procedure according to some embodiments of the present disclosure.

FIG. 2B illustrates an exemplary MCG recovery procedure 200B according to some embodiments of the present disclosure. Details described in all of the foregoing embodiments of the present disclosure are applicable for the embodiments shown in FIG. 2B.

The exemplary procedure 200A shows a procedure of a UE (e.g., UE 33) communicating with a MN (e.g., MN 13A) and a SN (e.g., SN 13B). In some examples, UE 33 may function as UE 30 in FIG. 1, and MN 12A and SN 13B may function as BS 10A or BS 10B in FIG. 1.

Referring to FIG. 2B, at the beginning, UE 33 may be in communication with MN 13A, though which UE 33 may connect to a MCG. In operation 221, UE 33 may detect a MCG failure. UE 33 may then generate a MCG failure information message indicating a failure type, which may indicate a link failure due to, for example, one of the following:
an expiry of a physical layer problem timer (e.g., T310);
a random access problem; and
reaching a maximum number of retransmission.

In some embodiments of the present disclosure, UE 33 may be configured with SRB3 to report MCG failures. In this case, UE 33 may encapsulate the MCG failure information message into an RRC message for communication between a UE and a MN (e.g., an ULInformationTransferMRDC message). In operation 223, UE 33 may transmit the RRC message to SN 13B via SRB3. After receiving the RRC message, SN 13B would know it is for the MN. So SN 13B will not decode the MCG failure information message in the RRC message, and may transfer the RRC message to MN 13A in operation 225.

In operation 227, MN 13A may decode the MCG failure information message, and may determine to keep, change, or release the failed MCG link. In the case that MN 13A determines to change or release the MCG, MN 13A may encapsulate an RRC reconfiguration message or an RRC release message into an RRC message for communication between a UE and a MN (e.g., a DLInformationTransfer-MRDC message). MN 13A may transmit, in operation 229 (denoted by dotted arrow as an option), the RRC message to SN 13B, which may transfer, in operation 231 (denoted by dotted arrow as an option), the message to UE 33 via SRB3. In the case that MN 13A determines to keep the MCG, operations 229 and 231 may be eliminated.

It should be appreciated by persons skilled in the art that the sequence of the operations in exemplary procedure 200B may be changed and some of the operations in exemplary procedure 200B may be eliminated or modified, without departing from the spirit and scope of the disclosure.

As mentioned above, for NR communication networks, 3GPP is envisioning an IAB architecture for supporting multi-hop relays, wherein a donor node with multi-connectivity is also supported by an IAB node.

Figure 3A:
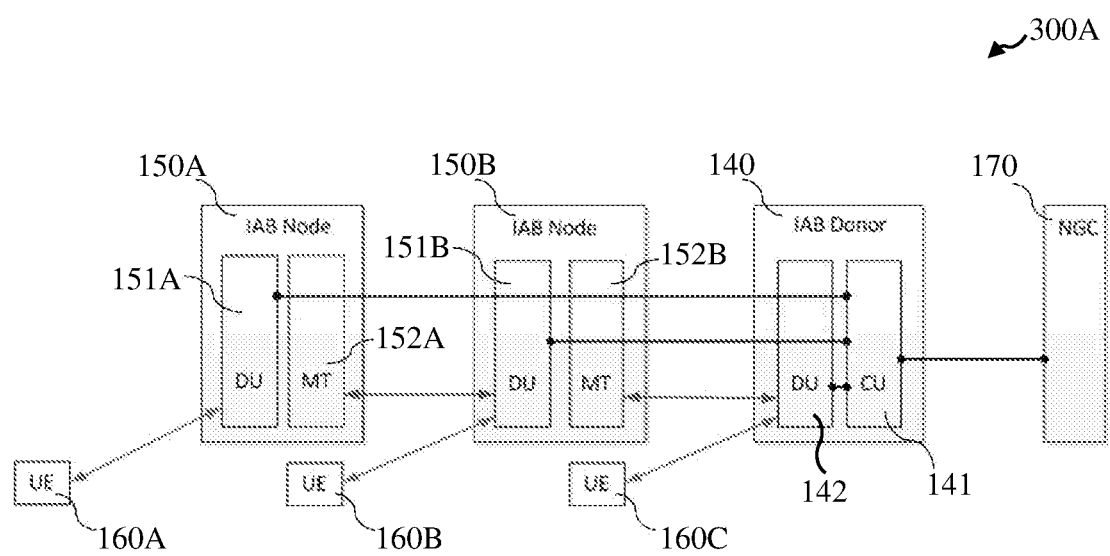
FIG. 3A illustrates a wireless communication system according to some embodiments of the present disclosure.

FIG. 3A illustrates an exemplary wireless communication system 300A according to some embodiments of the present disclosure. Details described in all of the foregoing embodiments of the present disclosure are applicable for the embodiments shown in FIG. 3A.

Referring to FIG. 3A, the wireless communication system 100A may include a BS (e.g., IAB donor 140), some access nodes including IAB nodes (e.g., IAB node 150A and IAB node 150B) and UEs (e.g., UE 160A, UE 160B, and UE 160C), and a Next-Generation Core (NGC) 170.

An IAB donor (e.g., IAB donor 140) may support gNB-DU functionality and gNB-CU functionality. The gNB-DU functionality and the gNB-CU functionality are defined in 3GPP specification TS 38.401.

An IAB node (e.g., IAB node 150A and IAB node 150B) may support gNB-DU functionality to terminate the NR access interface to UEs and next-hop IAB nodes and to terminate the F1 protocol to gNB-CU functionality on an IAB donor. In addition to the gNB-DU functionality, an IAB-node may also support a subset of the UE functionality referred to as IAB-MT (Mobile Termination). The above descriptions with respect a UE may also be applied to IAB-MT. An IAB MT may include, for example, physical layer, layer-2, RRC and Non-Access Stratum (NAS) functionality to connect to the gNB-DU of another IAB-node or the IAB-donor and to connect to the gNB-CU on the IAB-donor. The DU of an IAB node DU is also referred to as IAB-DU.

As shown in FIG. 3A, IAB node 150A may be connected to an upstream IAB node 150B via MT 152A. IAB node 150A may be connected to UE 160A via the Distributed Unit (DU) 151A. IAB node 150B may be connected to an upstream IAB node or IAB donor 140 via MT 152B. IAB node 150B may be connected to UE 160B via DU 151B. IAB node 150B may be connected to downstream IAB node 150A via DU 151B.

A Central Unit (CU) 141 included in the IAB donor 140 controls the DUs of all IAB nodes (e.g., IAB node 150A and IAB node 150B) and the DU(s) (e.g., DU 142) resided in the IAB donor 140. The DU(s) and the CU of an IAB donor may be co-located or may be located in different positions. The DU(s) and the CU of the IAB donor are connected via an F1 interface. In other words, the F1 interface provides a means for interconnecting the CU and the DU(s) of an IAB donor. The F1 Application Protocol (F1AP) supports the functions of the F1 interface by certain F1AP signaling procedures.

The wireless communication system 300A is in a standalone (SA) mode, in which each IAB node has only one parent node. In some other embodiments of the present disclosure, a wireless communication system may be in a non-standalone (NSA) mode, in which one or more IAB nodes may have more than one parent node.

Figure 3B:
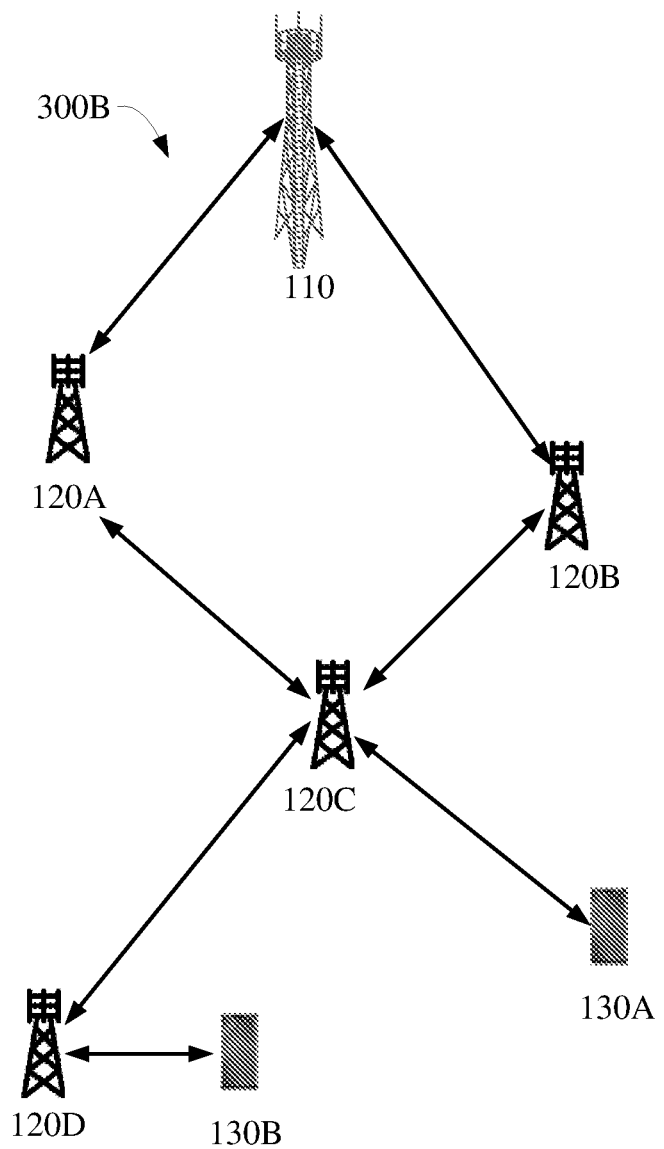
FIG. 3B illustrates a wireless communication system according to some embodiments of the present disclosure.

FIG. 3B illustrates a wireless communication system 300B according to some embodiments of the present disclosure. Details described in all of the foregoing embodiments of the present disclosure are applicable for the embodiments shown in FIG. 3B.

Referring to FIG. 3B, the wireless communication system 300B can include an IAB donor node (e.g., donor node 110), some IAB nodes (e.g., IAB node 120A, IAB node 120B, IAB node 120C, and IAB node 120D), and some UEs (e.g., UE 130A and UE 130B). Although merely, for simplicity, one donor node is illustrated in FIG. 3B, it is contemplated that the wireless communication system 300B may include more donor node(s) in some other embodiments of the present disclosure. Similarly, although merely four IAB nodes and two UEs are illustrated in FIG. 3B for simplicity, it is contemplated that the wireless communication system 300B may include more or fewer IAB nodes and UEs in some other embodiments of the present disclosure.

IAB node 120A is directly connected to donor node 110. IAB node 120B is directly connected to donor node 110. IAB node 120A can be connected to donor node(s) other than donor node 110 in accordance with some other embodiments of the present disclosure. IAB node 120B can be connected to donor node(s) other than donor node 110 in accordance with some other embodiments of the present disclosure.

IAB node 120C can reach donor node 110 via Dual-Connectivity (DC). For example, JAB node 120C can reach donor node 110 via IAB node 120A or IAB node 120B. IAB node 120A and IAB node 120B are parent nodes of IAB node 120C. In other words, IAB node 120C is a child node of JAB node 120A and IAB node 120B.

In some embodiments of the present disclosure, IAB donor 110 may configure IAB 120A and IAB 120B as Master node (MN) and Secondary Node (SN), respectively, at IAB node 120C. In other words, IAB donor 110 may configure IAB 120A and IAB 120B as the DU of an MN (hereinafter also referred to as "MN DU") the DU of an SN (hereinafter also referred to as "SN DU"), respectively. The CU of the MN (hereinafter also referred to as "MN CU") and the CU of the SN (hereinafter also referred to as "SN CU") are configured at IAB donor 110. That is, the MN and SN may share the same CU (e.g., the CU of IAB donor 110).

IAB node 120D may be directly connected to IAB node 120C, and is a child node of IAB node 120C. IAB node 120A, IAB node 120B, and IAB node 120C are upstream nodes of IAB node 120D. IAB node 120A and IAB node 120B are upstream nodes of IAB node 120C. IAB node 120C and IAB node 120 are downstream nodes of IAB node 120A and IAB node 120B. Upstream node(s) of an IAB node includes parent node(s) of the IAB node, and downstream node(s) of an IAB node includes child node(s) of the IAB node.

UE 130A is directly connected to IAB node 120C, and UE 130B is directly connected to IAB node 120D. In other words, UE 130A and UE 130B are served by IAB node 120C and IAB node 120D, respectively. Each of IAB node 120A, IAB node 120B, IAB node 120C, and IAB node 120D may be directly connected to one or more UEs in accordance with some other embodiments of the present disclosure. Each of IAB node 120A, IAB node 120B, IAB node 120C, and IAB node 120D may be directly connected to one or more IAB nodes in accordance with some other embodiments of the present disclosure.

As described above with respect to FIGS. 1, 2A and 2B, a UE may initiate a procedure to report the SCG failure or a MCG recovery procedure under certain circumstances. An IAB node (e.g., IAB node 120A) with multi-connectively (e.g., dual-connectivity) may also need to report the SCG failure or MCG failure to the MN under the above-mentioned circumstances.

Moreover, in the wireless communication system 300B, which provides multi-hop relay, a wireless Backhaul (BH) link may fail due to, for example but is not limited to, blockage by moving object(s) (e.g., vehicle(s)), foliage (caused by seasonal changes), new building(s) (e.g., infrastructure changes). Such backhaul link failure may occur either on a physically stationary IAB node or a mobile IAB node. For example, a backhaul link failure may occur on the backhaul link between IAB node 120A and IAB donor 110, between IAB node 120B and IAB donor 110, between IAB node 120A and IAB node 120C, or between IAB node 120B and IAB node 120C.

When a backhaul RLF recovery failure is detected at IAB node 120B (e.g., the MT of IAB node 120B), for example, when a RLF occurs on the backhaul link between IAB node 120B and IAB donor 110, IAB node 120B (which may act as a SN) may notify its child nodes (e.g., IAB node 120C) of such failure. IAB node 120C may need to report the SCG failure to inform the MN.

Similarly, when a backhaul RLF recovery failure is detected at IAB node 120A (e.g., the MT of IAB node 120A), for example, when a RLF occurs on the backhaul link between IAB node 120A and IAB donor 110, IAB node 120A (which may act as a MN) may notify its child nodes (e.g., IAB node 120C) of such failure. IAB node 120C may need to report the MCG failure to inform the MN.

There is a need for handling the transmission and reception of failure information of the backhaul link in a wireless communication system deploying IAB nodes (also referred to as "an IAB system").

Moreover, as mentioned above, a UE may be configured with split SRB1 or SRB3 to report MCG failures when a RLF on a MCG link happens. In an IAB system, split SRB may not be supported. In this scenario, the failure information message may be reported via SRB3. However, in an IAB system, it may be unnecessary to include the failure information message in, for example, the uplink information transfer message, since the MN and SN may share the same CU. There is a need to improve the transmission and reception of failure information via SRB3 in a wireless communication system deploying IAB nodes.

More details on the embodiments of the present disclosure will be illustrated in the following text in combination with the appended drawings.

Figure 4:
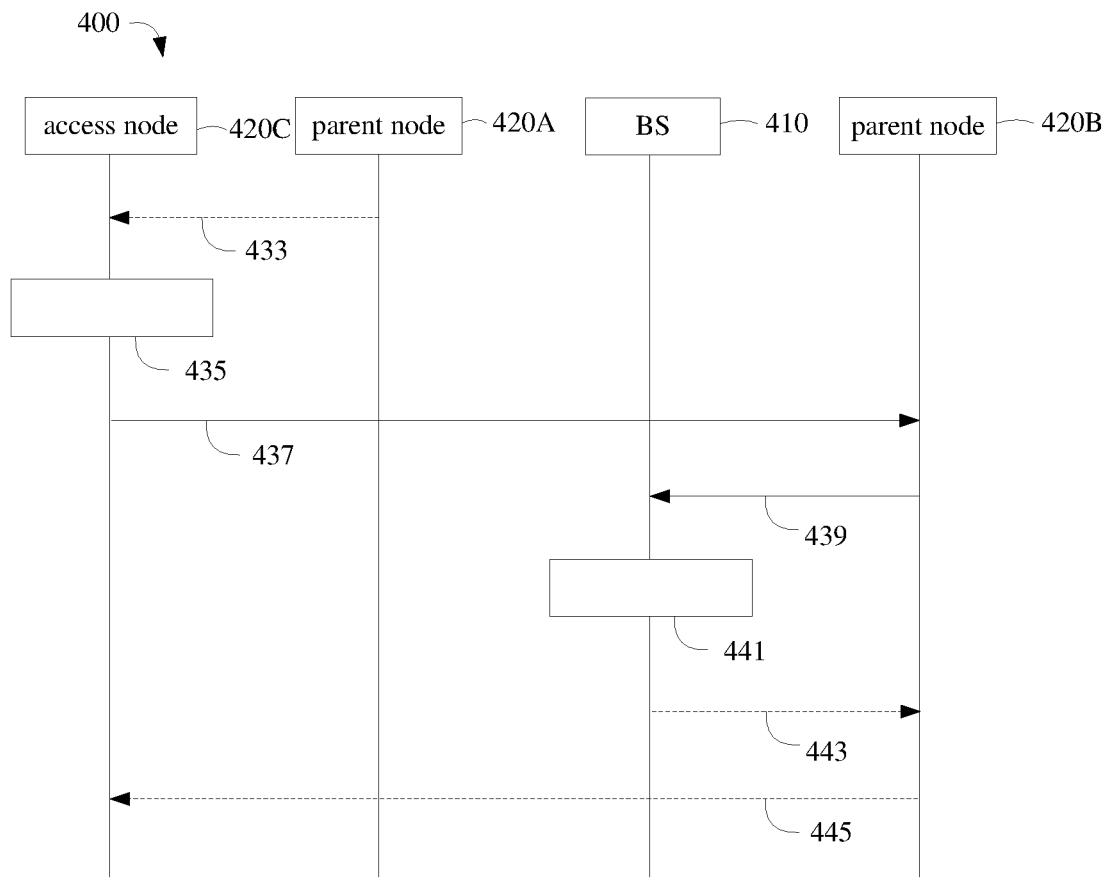
FIG. 4 illustrates an exemplary fast MCG link recovery procedure according to some embodiments of the present disclosure.

FIG. 4 illustrates an exemplary MCG recovery procedure 400 according to some embodiments of the present disclosure. Details described in all of the foregoing embodiments of the present disclosure are applicable for the embodiments shown in FIG. 4.

In FIG. 4, access node 420C is accessing a BS 410 via parent node 420A and parent node 420B, respectively. Parent node 420A and parent node 420A are configured as an MN DU and an SN DU, respectively. The MN CU and the SN CU are configured at BS 410. Access node 420C may connect to BS 410 through MN DU (e.g., parent node 420A) and SN DU (e.g., parent node 420B), respectively.

Access node 420C may function as IAB node 120C shown in FIG. 3B, parent node 420A and parent node 420B may function as IAB node 120A and IAB node 120B shown in FIG. 3B, and BS 410 may function as IAB donor 110 shown in FIG. 3B. In this case, the DUs of parent node 420A and parent node 420B may be configured as MN DU and SN DU, respectively. The CUs of MN and SN are configured at the CU of BS 410.

In operation 435, access node 420C may determine a MCG failure. For example, access node 420C may consider a radio link failure to be detected upon an expiry of a physical layer problem timer (e.g., T310), a random access problem, or reaching a maximum number of retransmission in response to the radio link failure (RLF) associated with the MCG, and the RLF in the MCG link may thus be declared.

After determining a MCG failure, access node 420C may initiate a fast MCG link recovery procedure. For example, access node 420C may operate as an IAB-MT, and may generate a failure information message (e.g., a MCG failure information message) to notify BS 410 of the MCG failure. The failure information message may include a failure type of a backhaul link (e.g., between access node 420C and parent node 420A). The failure type may be based on a failure type set including at least the following: an expiry of a physical layer problem timer, a random access problem, and reaching a maximum number of retransmission in response to the RLF.

For example, when access node 420C determines an expiry of a physical layer problem timer (e.g., T310) for the MCG, the failure type may indicate a T310 expiry. Similarly, when access node 420C determines a random access problem for the MCG, or reaching a maximum number of retransmission in response to the RLF associated with the MCG, the failure type may indicate a random access problem or reaching a maximum retransmission number.

In some embodiments of the present disclosure, access node 420C may, in operation 433 (denoted by dotted arrow as an option), receive a signaling message from parent node 420A. The signaling message may indicate a failure in a backhaul link (e.g., between parent node 420A and BS 410). Access node 420C may consider a radio link failure to be detected upon receiving the signaling message, and RLF in the MCG link may thus be declared.

In some embodiments of the present disclosure, the signaling message from parent node 420A may indicate a cause value of the failure in the backhaul link (e.g., between parent node 420A and BS 410). The cause value may indicate, for example, one of an expiry of a physical layer problem timer (e.g., T310), a random access problem, and reaching a maximum number of retransmission.

Access node 420C may generate the failure information message based on the signaling message. For example, the failure type in the failure information message may be based on the cause value in the signaling message. For example, when the cause value indicates a T310 expiry for a backhaul link (e.g., between parent node 420B and BS 410), the failure type may indicate a T310 expiry. Similarly, when the cause value indicates a random access problem for the backhaul link, or reaching a maximum number of retransmission in response to a RLF on the backhaul link, the failure type may indicate a random access problem or reaching a maximum retransmission number.

In some embodiments of the present disclosure, the failure type set may further include a backhaul RLF, besides an expiry of a physical layer problem timer, a random access problem, and reaching a maximum number of retransmission in response to a RLF, as mentioned above. After receiving the signaling message, access node 420C may set the failure type in the failure information message to indicate a backhaul RLF.

In some embodiments of the present disclosure, the failure type set may be based on an enumerated list indicating at least the above-mentioned four failure types, i.e., an expiry of a physical layer problem timer, a random access problem, reaching a maximum number of retransmission in response to a RLF, and a backhaul RLF. The enumerated list may include one or more spare enumerated types reserved for future use. For example, the failure type set may be enumerated as {t310-Expiry, randomAccessProblem, rlc-MaxNumRetx, bh-rlf-r16, spare4, spare3, spare2, spare1}, wherein "t310-Expiry," "randomAccessProblem," "rlc-MaxNumRetx," and "bh-rlf-r16" correspond to the above-mentioned four different failure types, and "spare4," "spare3," "spare2" and "spare1" are reserved for future use.

In some embodiments of the present disclosure, the failure type set may be based on two enumerated lists, one indicating at least the three failure types, i.e., an expiry of a physical layer problem timer, a random access problem, and reaching a maximum number of retransmission in response to a RLF, and the other indicating at least the fourth failure type, i.e., a backhaul RLF. Each or either one of the two enumerated lists may include one or more spare enumerated types reserved for future use. For example, one enumerated list may be {t310-Expiry, randomAccessProblem, rlc-MaxNumRetx, spare} and the other enumerated list may be {bh-rlf, spare3, spare2, spare1}, wherein "bh-rlf" corresponds to the above-mentioned fourth failure type, and "spare" is reserved for future use.

It should be understood that the above enumerated lists are only for illustrative purposes, and should not be construed as limiting the embodiments of the present disclosure.

In the above embodiments, an access node (e.g., access node 420C operating as an IAB-MT or a UE) sets the failure type to indicate a backhaul RLF when the access node initiates the transmission of the failure information message (e.g., MCG failure information message) due to the reception of the signaling message (e.g., a backhaul RLF indication).

In some embodiments of the present disclosure, an access node may set the failure type to indicate a backhaul RLF when the access node initiates the transmission of the failure information message to provide backhaul RLF information for an MCG.

In some embodiments of the present disclosure, an access node may set the failure type to indicate a backhaul RLF when the access node initiates the transmission of the failure information message to provide the backhaul RLF indication from a Backhaul Adaptation Protocol (BAP) layer of an MCG.

The failure type of "a backhaul RLF" may also be referred to as "receiving a backhaul RLF indication," "backhaul link failure," "backhaul link problem" or the like.

In some embodiments of the present disclosure, the failure information message may further include information indicating two nodes which terminate the backhaul link. For example, in the case that access node 420C receives the signaling message from parent node 420A indicating a failure in a backhaul link (e.g., between parent node 420A and BS 410), the IDs of parent node 420A (e.g., the DU ID of parent node 420A) and BS 410 may be indicated in the failure information message. In the case that access node 420C determines the failure in the backhaul link between parent node 420A and access node 420C, the IDs of parent node 420A (e.g., the DU ID of parent node 420A) and access node 420C may be indicated in the failure information message.

In some embodiments of the present disclosure, access node 420C may receive a configuration indicating for fast MCG link recovery from, for example, BS 410 (not shown in FIG. 4). The configuration may indicate a value of a MCG link recovery timer (e.g., T316). Access node 420C may start the MCG link recovery timer and may initiate the fast MCG link recovery procedure in response to a RLF (e.g., after a RLF is declared). If the MCG link is not recovered before the expiry of the MCG link recovery timer, access node 420C may initiate a reestablishment procedure.

In some embodiments of the present disclosure, the value of the MCG link recovery timer may be set as infinite. In this case, access node 420C is allowed to initiate the fast MCG link recovery procedure in response to a RLF in the MCG link, but the MCG link recovery timer will never expire. So the reestablishment procedure upon the expiry of the MCG link recovery timer will not be performed. In some examples, the possible value of the MCG link recovery timer may be enumerated as {50 ms, 100 ms, . . . , infinity}, wherein enumerated types "50 ms" and "100 ms" represent that the value of the timer is set as 50 ms and 100 ms, respectively, and enumerated type "infinity" represents that the value of the timer is set as infinite.

In some embodiments of the present disclosure, access node 420C may not receive the above configuration information. In these embodiments, fast MCG link recovery procedure may not be allowed. In other word, access node 420C may not be allowed to initiate the fast MCG link recovery procedure in response to a RLF in the MCG link.

In some embodiments of the present disclosure, the failure information message may be encapsulated in another RRC message (e.g., a UL information transfer message) for transmitting to parent node 420B via SRB3. For example, after generating the failure information message as described above, access node 420C may encapsulate the failure information message in a UL information transfer message. In operation 437, access node 420C (which may operate as an IAB-MT) may transmit the failure information message to parent node 420B by transmitting the UL information transfer message on SRB3. In operation 439, parent node 420B may forward the UL information transfer message to BS 410. In operation 441, BS 410 may decode the failure information message encapsulated in the UL information transfer message, and may not transfer the UL information transfer message.

BS 410 may determine whether to keep, change, or release the failed MCG link. In the case that BS 410 determines to change or release the failed MCG link, BS 410 may encapsulate an RRC reconfiguration message or an RRC release message into another RRC message (e.g., a DL information transfer message). In operation 443 (denoted by dotted arrow as an option), BS 410 may transmit the DL information transfer message to parent node 420B, which may forward the same to access node 420C in operation 445 (denoted by dotted arrow as an option). Access node 420C may decode the RRC reconfiguration message or the RRC release message encapsulated in the DL information transfer message, and may perform a corresponding procedure. In the case that BS 410 determines to keep the failed MCG link, operations 443 and 445 may be eliminated.

In some embodiments of the present disclosure, the failure information message may not be encapsulated in the UL information transfer message. For example, in operation 437, access node 420C (which may operate as an IAB-MT) may transmit the failure information message to parent node 420B on SRB3. The failure information message is not encapsulated in the UL information transfer message. In operation 439, parent node 420B may forward the UL information transfer message to BS 410.

In operation 441, BS 410 may determine whether to keep, change, or release the failed MCG link. In the case that BS 410 determines to change or release the failed MCG link, in operation 443 (denoted by dotted arrow as an option), BS 410 may transmit an RRC reconfiguration message or an RRC release message to parent node 420B. The RRC reconfiguration message or the RRC release message is not encapsulated in the DL information transfer message. In operation 445 (denoted by dotted arrow as an option), parent node 420B may forward the RRC reconfiguration message or the RRC release message to access node 420C. Access node 420C may perform a corresponding procedure upon receiving the RRC reconfiguration message or the RRC release message. In the case that BS 410 determines to keep the failed MCG link, operations 443 and 445 may be eliminated.

In some embodiments of the present disclosure, a BS (e.g., BS 410 in FIG. 4) may indicate an access node (e.g., IAB node 420C in FIG. 4) whether to encapsulate the failure information message in the UL information transfer message.

For example, BS 410 in FIG. 4 (e.g., CU of BS 410) may transmit a signaling message whether to encapsulate the failure information message in the UL information transfer message. When the signaling message indicates to encapsulate the failure information message in the UL information transfer message, access node 420C may encapsulate the failure information message in a UL information transfer message, and may transmit the failure information message to parent node 420B by transmitting the UL information transfer message on SRB3.

After receiving the UL information transfer message, BS 410 may, in operation 441, decode the failure information message encapsulated in the UL information transfer message, and may not transfer the UL information transfer message. In the case that BS 410 determines to change or release the failed MCG link, BS 410 may encapsulate an RRC reconfiguration message or an RRC release message into a DL information transfer message, which may be transmitted to access node 420C via parent node 420B. Access node 420C may decode the RRC reconfiguration message or the RRC release message encapsulated in the DL information transfer message, and may perform a corresponding procedure.

When the signaling message indicates not to encapsulate the failure information message in the UL information transfer message, access node 420C may transmit the failure information message on SRB3 without encapsulating the failure information message in the UL information transfer message.

After receiving the failure information message, BS 410 may determine whether to keep, change, or release the failed MCG link. In the case that BS 410 determines to change or release the failed MCG link, in operations 443 and 445 (denoted by dotted arrow as an option), BS 410 may transmit an RRC reconfiguration message or an RRC release message to access node 420C via parent node 420B without encapsulating the RRC reconfiguration message or the RRC release message in a DL information transfer message. Access node 420C may perform a corresponding procedure upon receiving the RRC reconfiguration message or the RRC release message.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
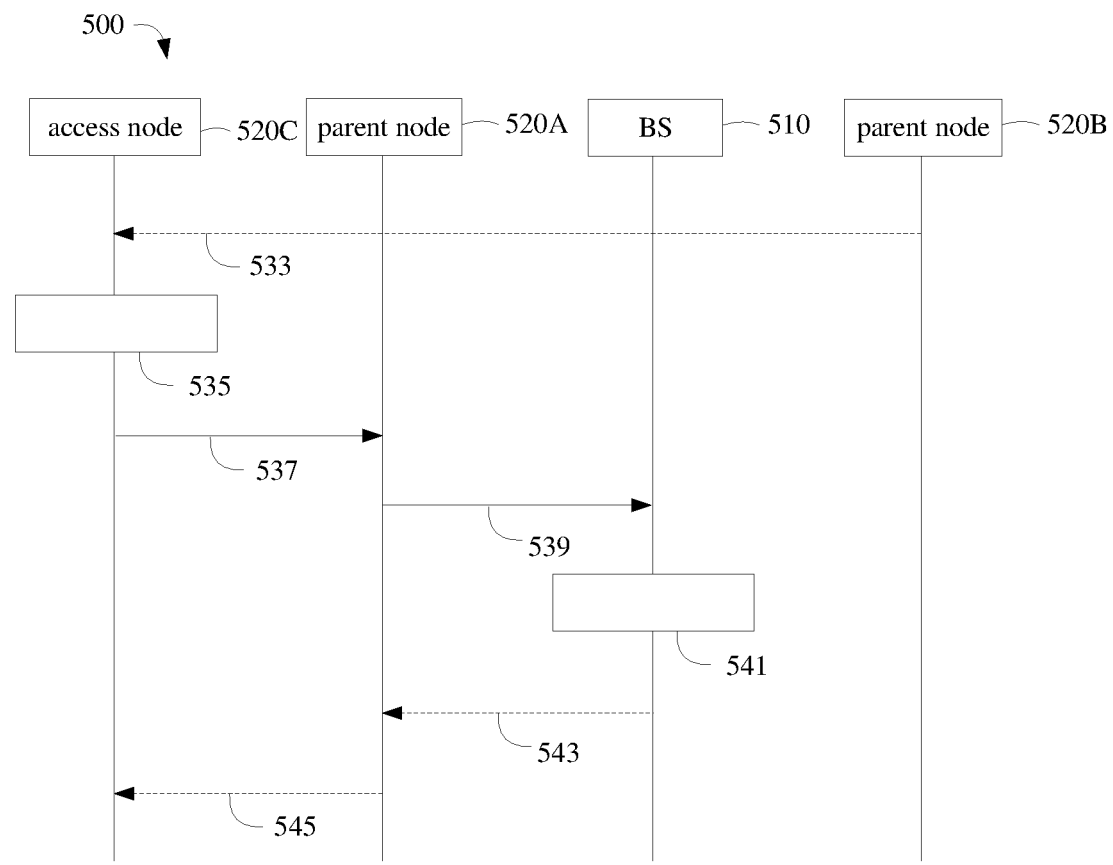
FIG. 5 illustrates an exemplary procedure of reporting a SCG failure according to some embodiments of the present disclosure.

FIG. 5 illustrates an exemplary procedure 400 of reporting a SCG failure according to some embodiments of the present disclosure. Details described in all of the foregoing embodiments of the present disclosure are applicable for the embodiments shown in FIG. 5.

In FIG. 5, access node 520C is accessing a BS 510 via parent node 520A and parent node 520B. Parent node 520A and parent node 520B are configured as MN DU and SN DU, respectively. The MN CU and the SN CU are configured at BS 510. Access node 520C may connect to BS 510 through MN DU (e.g., parent node 520A) and SN DU (e.g., parent node 520B), respectively.

Access node 520C may function as IAB node 120C shown in FIG. 3B, parent node 520A and parent node 520B may function as IAB node 120A and IAB node 120B shown in FIG. 3B, and BS 510 may function as IAB donor 110 shown in FIG. 3B. In this case, the DUs of parent node 520A and parent node 520B may be configured as MN DU and SN DU, respectively. The CUs of MN and SN are configured at the CU of BS 510.

In operation 535, access node 520C may determine a SCG failure. For example, access node 520C may consider a radio link failure to be detected upon an expiry of a physical layer problem timer (e.g., T310), a random access problem, or reaching a maximum number of retransmission in response to the radio link failure (RLF) associated with the SCG, and the RLF in the SCG link may thus be declared.

After determining a SCG failure, access node 520C may initiate a procedure to report the SCG failure. For example, access node 520C may operate as an IAB-MT, and may generate a failure information message (e.g., a SCG failure information message) to notify BS 510 of the SCG failure. The failure information message may include a failure type of a backhaul link (e.g., between access node 520C and parent node 520B). The failure type may be based on a failure type set including at least the following: an expiry of a physical layer problem timer, a random access problem, and reaching a maximum number of retransmission in response to the RLF.

For example, when access node 520C determines an expiry of a physical layer problem timer (e.g., T310) for the SCG, the failure type may indicate a T310 expiry. Similarly, when access node 520C determines a random access problem for the SCG, or reaching a maximum number of retransmission in response to a RLF associated with the SCG, the failure type may indicate a random access problem or reaching a maximum retransmission number.

In operation 537, access node 520C (which may operate as an IAB-MT) may transmit the failure information message to parent node 520A, which may forward the failure information message to BS 510 in operation 539.

In some embodiments of the present disclosure, access node 520C may, in operation 533 (denoted by dotted arrow as an option), receive a signaling message from parent node 520B. The signaling message may indicate a failure in a backhaul link (e.g., between parent node 520B and BS 510). Access node 520C may consider a radio link failure to be detected upon receiving the signaling message, and may report the SCG failure.

In some embodiments of the present disclosure, the signaling message from parent node 520B may indicate a cause value of the failure in the backhaul link (e.g., between parent node 520B and BS 510). The cause value may indicate, for example, one of an expiry of a physical layer problem timer (e.g., T310), a random access problem, and reaching a maximum number of retransmission.

Access node 520C may generate the failure information message based on the signaling message. For example, the failure type in the failure information message may be based on the cause value in the signaling message. For example, when the cause value indicates a T310 expiry for a backhaul link (e.g., between parent node 520B and BS 510), the failure type may indicate a T310 expiry. Similarly, when the cause value indicates a random access problem for the backhaul link, or reaching a maximum number of retransmission in response to a RLF on the backhaul link, the failure type may indicate a random access problem or reaching a maximum retransmission number.

In some embodiments of the present disclosure, the failure type set may further include a backhaul RLF, besides an expiry of a physical layer problem timer, a random access problem, and reaching a maximum number of retransmission in response to a RLF, as mentioned above. After receiving the signaling message, access node 520C may set the failure type in the failure information message to indicate a backhaul RLF.

In some embodiments of the present disclosure, the failure type set may be based on an enumerated list indicating at least the above-mentioned four failure types, i.e., an expiry of a physical layer problem timer, a random access problem, reaching a maximum number of retransmission in response to a RLF, and a backhaul RLF. The enumerated list may include one or more spare enumerated types reserved for future use. For example, the failure type set may be enumerated as {t310-Expiry, randomAccessProblem, rlc-MaxNumRetx, bh-rlf-r16, spare2, spare1}, wherein "t310-Expiry," "randomAccessProblem," "rlc-MaxNumRetx," and "bh-rlf-r16" correspond to the above-mentioned four different failure types, and "spare2" and "spare1" are reserved for future use.

In some embodiments of the present disclosure, the failure type set may be based on two enumerated lists, one indicating at least the three failure types, i.e., an expiry of a physical layer problem timer, a random access problem, and reaching a maximum number of retransmission in response to a RLF, and the other indicating at least the fourth failure type, i.e., a backhaul RLF. Each or either one of the two enumerated lists may include one or more spare enumerated types reserved for future use. For example, one enumerated list may be {t310-Expiry, randomAccessProblem, rlc-MaxNumRetx, . . . } and the other enumerated list may be {bh-rlf, spare3, spare2, spare1}, wherein "bh-rlf" corresponds to the above-mentioned fourth failure type, and "spare3" is reserved for future use.

It should be understood that the above enumerated lists are only for illustrative purposes, and should not be construed as limiting the embodiments of the present disclosure.

In the above embodiments, an access node (e.g., access node 520C operating as an IAB-MT or a UE) sets the failure type to indicate a backhaul RLF when the access node initiates the transmission of the failure information message due to the reception of the signaling message (e.g., a backhaul RLF indication).

In some embodiments of the present disclosure, an access node may set the failure type to indicate a backhaul RLF when the access node initiates the transmission of the failure information message to provide backhaul RLF information for an SCG.

In some embodiments of the present disclosure, an access node may set the failure type to indicate a backhaul RLF when the access node initiates the transmission of the failure information message to provide the backhaul RLF indication from a Backhaul Adaptation Protocol (BAP) layer of an SCG.

The failure type of "a backhaul RLF" may also be referred to as "receiving a backhaul RLF indication," "backhaul link failure," "backhaul link problem" or the like.

In some embodiments of the present disclosure, the failure information message may further include information indicating two nodes which terminate the backhaul link. For example, in the case that access node 520C receives the signaling message from parent node 520B indicating a failure in a backhaul link (e.g., between parent node 520B and BS 510), the IDs of parent node 520B (e.g., the DU ID of parent node 520B) and BS 510 may be indicated in the failure information message. In the case that access node 520C determines the failure in the backhaul link between parent node 520B and access node 520C, the IDs of parent node 520B (e.g., the DU ID of parent node 520B) and access node 520C may be indicated in the failure information message.

In some embodiments of the present disclosure, the failure information message may further include information indicating child nodes (e.g., child IAB nodes) of access node 520C. The information indicating the child nodes may include IDs of the child nodes. For example, in the case that EUTRA-NR dual connectivity is supported, the information can inform an eNB about the child IAB nodes. EUTRA is an abbreviation of Evolved Universal Terrestrial Radio Access.

Referring to FIG. 5, in operation 541, BS 510 may determine whether to keep, change, or release the failed SCG link. In the case that BS 510 determines to change or release the failed SCG link, BS 510 may transmit, in operation 543 (denoted by dotted arrow as an option), an RRC reconfiguration message or an RRC release message to parent node 520A, which may forward the RRC reconfiguration message or the RRC release message to access node 520C in operation 545 (denoted by dotted arrow as an option). In the case that BS 510 determines to keep the failed SCG link, operations 543 and 545 may be eliminated.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
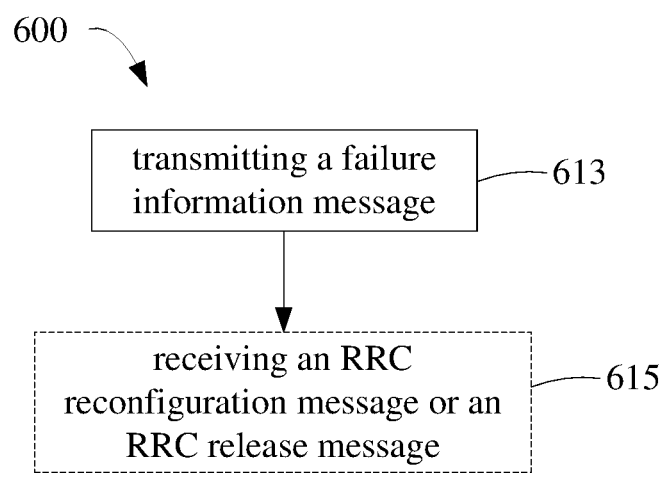
FIG. 6 illustrates an exemplary procedure of failure information transmission according to some embodiments of the present disclosure.

FIG. 6 illustrates an exemplary procedure 600 of failure information transmission according to some embodiments of the present disclosure. Details described in all the foregoing embodiments of the present disclosure are applicable for the embodiments shown in FIG. 6.

The exemplary procedure 600 shows a procedure of an access node (e.g., access node 420C in FIG. 4 or access node 520C in FIG. 5) communicating with an MN (e.g., the MN DU is configured at parent node 420A in FIG. 4 or parent node 520A in FIG. 5, and the MN CU is configured as BS 410 or BS 510) and an SN (e.g., the SN DU is configured at parent node 420B in FIG. 4 or parent node 520B in FIG. 5, and the SN CU is configured as BS 410 or BS 510).

In some embodiments of the present disclosure, the access node may consider a radio link failure to be detected upon certain conditions as described above with respect to FIGS. 4 and 5. Then, the access node may, in operation 613, transmitting a failure information message to the BS. The access node may generate the failure information message and may transmit the failure information message according to a method as described above with respect to FIGS. 4 and 5.

In some embodiments of the present disclosure, the access node may, in operation 615 (denoted by dotted block as an option), receive an RRC reconfiguration message or an RRC release message from the BS. The RRC reconfiguration message or an RRC release message may be received according to a method as described above with respect to FIGS. 4 and 5.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
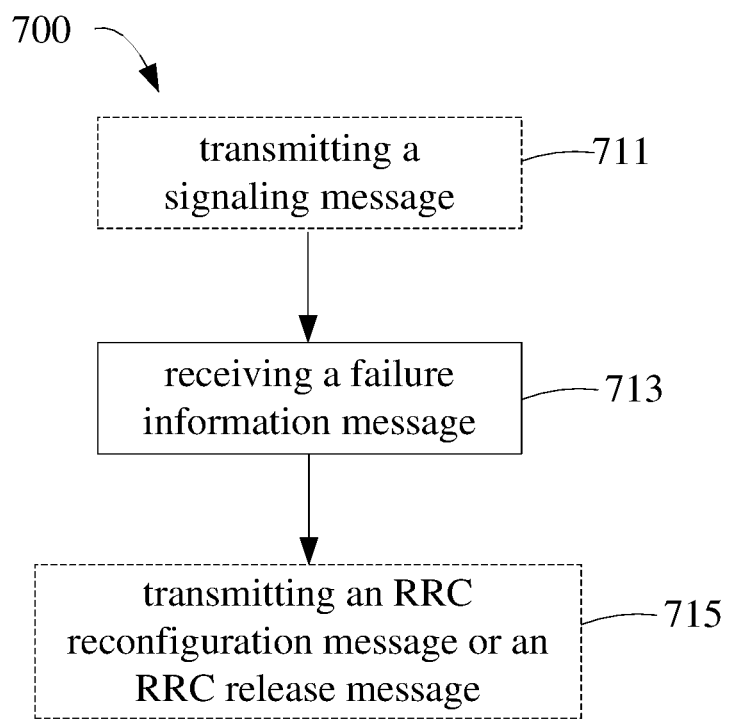
FIG. 7 illustrates an exemplary procedure of handling failure information according to some embodiments of the present disclosure.

FIG. 7 illustrates an exemplary procedure 700 of failure information transmission according to some embodiments of the present disclosure. Details described in all the foregoing embodiments of the present disclosure are applicable for the embodiments shown in FIG. 7.

The exemplary procedure 700 shows a procedure of a BS (e.g., BS 410 in FIG. 4 or BS 510 in FIG. 5) communicating with an access node (e.g., access node 420C in FIG. 4 or access node 520C in FIG. 5) via a plurality of parent nodes (parent nodes 420A and 420B in FIG. 4 or parent nodes 520A and 520B in FIG. 4) of the access node. A parent node (e.g., parent node 420A in FIG. 4 or parent node 520A in FIG. 5) of the plurality of parent nodes may be configured an MN DU, and another parent node (e.g., parent node 420B in FIG. 4 or parent node 520B in FIG. 5) of the plurality of parent nodes may be configured an SN DU.

In some embodiments of the present disclosure, the BS may transmit a configuration for fast MCG link recovery to the access node (not shown in FIG. 7). The configuration may indicate a value of a MCG link recovery timer, as described above with respect to FIGS. 4 and 5.

In operation 713, the BS may receive a failure information message from the access node. The failure information message may be configured and transmitted from the access node to the BS according to a method as described above with respect to FIGS. 4 and 5.

In some embodiments of the present disclosure, in operation 711 (denoted by dotted block as an option), the BS may transmit to the access node a signaling message indicating whether to encapsulate the failure information message in a uplink (UL) information transfer message.

In some embodiments of the present disclosure, in operation 715 (denoted by dotted block as an option), the BS may transmit an RRC reconfiguration message or an RRC release message from the access node. The RRC reconfiguration message or an RRC release message may be transmitted according to a method as described above with respect to FIGS. 4 and 5.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
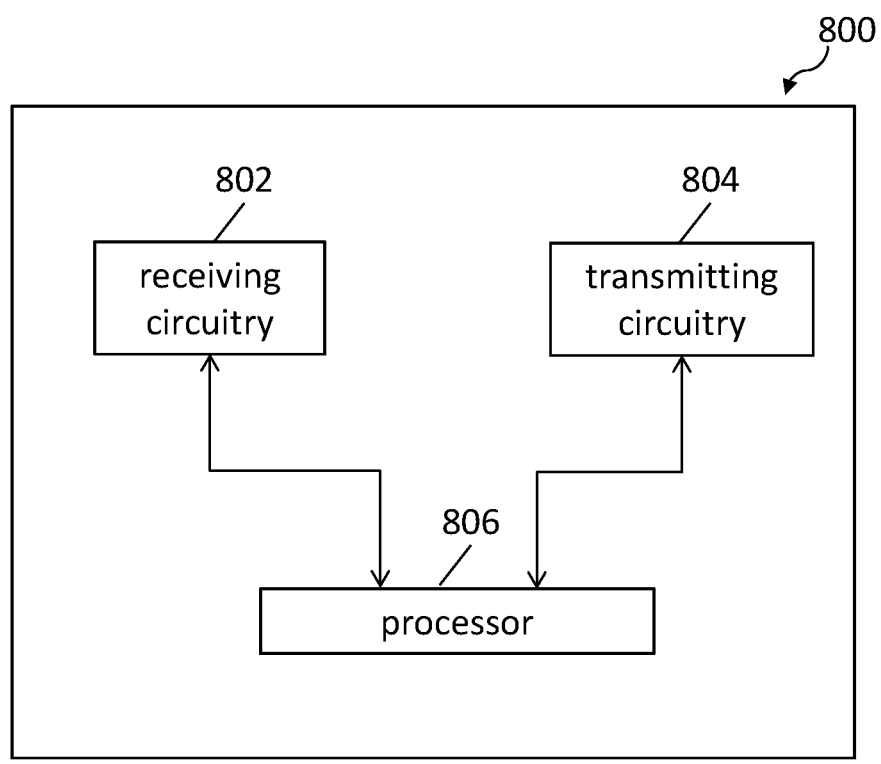
FIG. 8 illustrates an example block diagram of an apparatus according to some embodiments of the present disclosure.

FIG. 8 illustrates an example block diagram of an apparatus 800 according to some embodiments of the present disclosure.

As shown in FIG. 8, the apparatus 800 may include at least one non-transitory computer-readable medium (not illustrated in FIG. 8), a receiving circuitry 802, a transmitting circuitry 804, and a processor 806 coupled to the non-transitory computer-readable medium (not illustrated in FIG. 8), the receiving circuitry 802 and the transmitting circuitry 804. The apparatus 800 may be a BS or an access node (e.g., an IAB node or a UE).

Although in this figure, elements such as processor 806, transmitting circuitry 804, and receiving circuitry 802 are described in the singular, the plural is contemplated unless limitation to the singular is explicitly stated. In some embodiments of the present disclosure, the receiving circuitry 802 and the transmitting circuitry 804 are combined into a single device, such as a transceiver. In certain embodiments of the present disclosure, the apparatus 800 may further include an input device, a memory, and/or other components.

In some embodiments of the present disclosure, the non-transitory computer-readable medium may have stored thereon computer-executable instructions to cause a processor to implement the method with respect to the access node or IAB node as described above. For example, the computer-executable instructions, when executed, cause the processor 806 interacting with receiving circuitry 802 and transmitting circuitry 804, so as to perform the operations with respect to the access nodes or IAB nodes depicted in FIGS. 1-7.

In some examples, the transmitting circuitry 804 may transmit a failure information message. The failure information message may be generated according to one of the methods described above with respect to FIGS. 1-7. The receiving circuitry 802 may receive a signaling message indicating a failure in the backhaul link from a master node or a secondary node of the apparatus 800. The signaling message may be configured according to one of the methods described above with respect to FIGS. 1-7. The receiving circuitry 802 may receive a signaling message indicating whether to encapsulate the failure information message in an uplink (UL) information transfer message. The processor 806 may perform correspond procedures based on the signaling message according to the descriptions with respect to FIGS. 1-7. The receiving circuitry 802 may receive a configuration for fast MCG link recovery. The receiving circuitry 802 may receive an RRC reconfiguration message or an RRC release message.

In some embodiments of the present disclosure, the non-transitory computer-readable medium may have stored thereon computer-executable instructions to cause a processor to implement the method with respect to the BS or IAB donor as described above. For example, the computer-executable instructions, when executed, cause the processor 806 interacting with receiving circuitry 802 and transmitting circuitry 804, so as to perform the operations with respect to the IAB donors or base stations depicted in FIGS. 1-7.

In some examples, the receiving circuitry 802 may receive a failure information message. The failure information message may be configured according to one of the methods described above with respect to FIGS. 1-7. The transmitting circuitry 804 may transmit a signaling message indicating whether to encapsulate the failure information message in an uplink (UL) information transfer message. The transmitting circuitry 802 may transmit a configuration for fast MCG link recovery. The transmitting circuitry 802 may transmit an RRC reconfiguration message or an RRC release message.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

The following is what is claimed:

1. A method performed by an access node, the method comprising:
   receiving a message indicating a failure type of a backhaul link associated with at least one of a secondary node or a master node, wherein the access node is connected to the master node and the secondary node, wherein the access node is connected to a base station via the master node and the secondary node, and wherein the failure type is based at least in part on a failure type set including at least an expiry of a physical layer problem timer, a random access problem, and reaching a maximum number of retransmission in response to radio link failure RLF); and
   transmitting, responsive to the message, a failure information message to the base station, wherein the failure information message indicates the failure type of the backhaul link and that the failure type of the backhaul link is based at least in part on a backhaul RLF at the backhaul link associated with at least one of the secondary node or the master node.

2. The method of claim 1, wherein the message indicates a failure in the backhaul link from the master node, and wherein the failure information message is associated with a master cell group (MCG) link and is transmitted to the base station via the secondary node.

3. The method of claim 1, wherein the message indicates a failure in the backhaul link from the secondary node, and wherein the failure information message is associated with a secondary cell group (SCG) link.

4. A method performed by a master node, the method comprising:
   receiving, from an access node, a failure information message that indicates a failure type of a backhaul link associated with at least one of a secondary node or a base station and that the failure type of the backhaul link is based at least in part on a backhaul radio link failure (RLF) at the backhaul link associated with at least one of the secondary node or the master node, wherein the failure type is based at least in part on a failure type set including at least an expiry of a physical layer problem timer, a random access problem, and reaching a maximum number of retransmission in response to RLF.

5. An access node for wireless communication, comprising:
   at least one memory; and
   at least one processor coupled with the at least one memory and configured to cause the access node to:
      receive a message indicating a failure type of a backhaul link associated with at least one of a secondary node or a master node, wherein the access node is connected to the master node and the secondary node, wherein the access node is connected to a base station via the master node and the secondary node, and wherein the failure type is based at least in part on a failure type set including at least an expiry of a physical layer problem timer, a random access problem, and reaching a maximum number of retransmission in response to radio link failure (RLF); and
      transmit, responsive to the message, a failure information message to the base station, wherein the failure information message indicates the failure type of the backhaul link and that the failure type of the backhaul link is based at least in part on a backhaul RLF at the backhaul link associated with at least one of the secondary node or the master node.

6. The access node of claim 5, wherein the message indicates a failure in the backhaul link from the master node, and wherein the failure information message is associated with a master cell group (MCG) link and is transmitted to the base station via the secondary node.

7. The access node of claim 6, wherein the at least one processor is further configured to cause the access node to:
   receive an additional message indicating for the access node to encapsulate the failure information message in an uplink information transfer message.

8. The access node of claim 7, wherein to transmit the failure information message, the at least one processor is further configured to cause the access node to:
   encapsulate, in response to the additional message, the failure information message in the uplink information transfer message; and
   transmit the uplink information transfer message on a signaling radio bearer type 3 (SRB3).

9. The access node of claim 8, wherein the at least one processor is further configured to cause the access node to:
   receive a downlink information transfer message on the SRB3 in response to the failure information message, wherein a radio resource control (RRC) reconfiguration message or an RRC release message is encapsulated in the downlink information transfer message.

10. The access node of claim 7, wherein the additional message indicates for the access node not to encapsulate the failure information message in the uplink information transfer message, and wherein to transmit the failure information message, the at least one processor is configured to cause the access node to:

transmit the failure information message on a signaling radio bearer type 3 (SRB3) without encapsulating the failure information message in the uplink information transfer message.

11. The access node of claim 10, wherein the at least one processor is further configured to cause the access node to:
receive a radio resource control (RRC) reconfiguration message or an RRC release message on the SRB3 without encapsulating the RRC reconfiguration message or the RRC release message in a downlink information transfer message in response to the failure information message.

12. The access node of claim 5, wherein the message indicates a failure in the backhaul link from the secondary node, and wherein the failure information message is associated with a secondary cell group (SCG) link.

13. The access node of claim 5, wherein the at least one processor is further configured to cause the access node to:
detect at least one of the expiry of the physical layer problem timer, the random access problem, or reaching the maximum number of retransmission associated with the master node, wherein the failure information message is associated with a master cell group (MCG) link and is transmitted to the base station via the secondary node.

14. The access node of claim 13, wherein the failure information message is transmitted on a signaling radio bearer type 3 (SRB3) without encapsulating the failure information message in an uplink information transfer message based at least in part on the access node operating as an integrated access and backhaul (IAB) mobile termination (MT).

15. The access node of claim 14, wherein the at least one processor is further configured to cause the access node to:
receive a radio resource control (RRC) reconfiguration message or an RRC release message on the SRB3 without encapsulating the RRC reconfiguration message or the RRC release message in a downlink information transfer message in response to the failure information message.

16. The access node of claim 5, wherein the failure information message indicates that the failure type of the backhaul link is based at least in part on the backhaul RLF responsive to the message.

17. The access node of claim 5, wherein the failure information message indicates that the failure type of the backhaul link is based at least in part on a backhaul RLF responsive to the RLF being associated with a master cell group (MCG).

18. A processor for wireless communication, comprising:
at least one controller coupled with at least one memory and configured to cause the processor to:
receive a message indicating a failure type of a backhaul link associated with at least one of a secondary node or a master node, wherein the processor is connected to the master node and the secondary node, wherein the processor is connected to a base station via the master node and the secondary node, and wherein the failure type is based at least in part on a failure type set including at least an expiry of a physical layer problem timer, a random access problem, and reaching a maximum number of retransmission in response to radio link failure (RLF); and
transmit, responsive to the message, a failure information message to the base station, wherein the failure information message indicates the failure type of the backhaul link and that the failure type of the backhaul link is based at least in part on a backhaul RLF at the backhaul link associated with at least one of the secondary node or the master node.

19. The processor of claim 18, wherein the message indicates a failure in the backhaul link from the master node, and wherein the failure information message is associated with a master cell group (MCG) link and is transmitted to the base station via the secondary node.

20. The processor of claim 18, wherein the message indicates a failure in the backhaul link from the secondary node, and wherein the failure information message is associated with a secondary cell group (SCG) link.

* * * * *